(12) United States Patent
Boisseau et al.

(10) Patent No.: US 9,694,941 B2
(45) Date of Patent: Jul. 4, 2017

(54) DEVICE FOR INDICATING THE FILLING LEVEL OF A CONTAINER

(71) Applicant: Commissartat à l'Energie Atomique et aux Energies Alternatives, Paris (FR)

(72) Inventors: Sébastien Boisseau, Echirolles (FR); Ghislain Despesse, Voreppe (FR); Jean-François Mainguet, Grenoble (FR); Alexandre Paleologue, Bordeaux (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 186 days.

(21) Appl. No.: 14/636,405

(22) Filed: Mar. 3, 2015

(65) Prior Publication Data
US 2015/0259100 A1     Sep. 17, 2015

(30) Foreign Application Priority Data
Mar. 11, 2014 (FR) ...................................... 1451995

(51) Int. Cl.
*B65D 25/56* (2006.01)
*G01F 23/02* (2006.01)
(Continued)

(52) U.S. Cl.
CPC ................ *B65D 25/56* (2013.01); *F41A 9/64* (2013.01); *G01F 23/02* (2013.01); *G01F 23/303* (2013.01); *G01F 23/72* (2013.01); *G01F 23/76* (2013.01)

(58) Field of Classification Search
CPC ....... B65D 25/56; G01F 23/02; G01F 23/303; G01F 23/72
See application file for complete search history.

(56) References Cited

U.S. PATENT DOCUMENTS 3,964,312 A * 6/1976 Sebek ..................... G01F 23/66
 73/307
4,457,171 A * 7/1984 Gebauer ................. G01F 23/72
 73/305
(Continued)

FOREIGN PATENT DOCUMENTS

DE  3411908  10/1984
DE  4412163 A1 * 10/1995 ............. G01F 23/02
(Continued)

OTHER PUBLICATIONS

Fraden, Jacob. "Handbook of modern sensors: physics, designs, and applications." (2010). 7 pages.*
(Continued)

*Primary Examiner* — Lisa Caputo
*Assistant Examiner* — Punam Roy
(74) *Attorney, Agent, or Firm* — Moreno IP Law LLC

(57) ABSTRACT

A device for indicating the filling level of a container, including: a first mobile element located inside of the container and capable of moving along a wall of the container when the filling level of the container varies; an enclosure containing a liquid or a gel, located outside of the container on the side of said wall opposite to the first element; and a second mobile element located inside of the enclosure and plunged into said liquid or gel, the second element being magnetically coupled to the first element and being capable of moving in the enclosure along said wall by following the displacements of the first element.

20 Claims, 2 Drawing Sheets

(51) Int. Cl.
*G01F 23/30* (2006.01)
*G01F 23/72* (2006.01)
*G01F 23/76* (2006.01)
*F41A 9/64* (2006.01)

(56) References Cited

U.S. PATENT DOCUMENTS

| | | | | |
|---|---|---|---|---|
| 4,512,190 A | * | 4/1985 | Sledmere | G01F 23/72 |
| | | | | 335/302 |
| 7,987,710 B2 | * | 8/2011 | Stone | F41B 11/52 |
| | | | | 124/74 |
| 2003/0196488 A1 | * | 10/2003 | Mann | G01F 23/02 |
| | | | | 73/313 |
| 2004/0145377 A1 | * | 7/2004 | Sherrard | G01F 23/284 |
| | | | | 324/644 |
| 2005/0109105 A1 | * | 5/2005 | Kowalski | G01F 23/74 |
| | | | | 73/313 |
| 2007/0282540 A1 | * | 12/2007 | Hart | G01F 23/2963 |
| | | | | 702/25 |
| 2007/0295085 A1 | * | 12/2007 | Demin | G01F 23/72 |
| | | | | 73/447 |
| 2015/0253179 A1 | * | 9/2015 | Carlson | G01F 23/72 |
| | | | | 116/204 |
| 2015/0267981 A1 | * | 9/2015 | Faughn | F41A 9/62 |
| | | | | 42/1.02 |
| 2015/0268087 A1 | * | 9/2015 | Klein | G01F 23/72 |
| | | | | 73/313 |
| 2015/0276465 A1 | * | 10/2015 | Myers | G01F 23/72 |
| | | | | 73/309 |

FOREIGN PATENT DOCUMENTS

| | | | | |
|---|---|---|---|---|
| FR | 2667690 | | 4/1992 | |
| FR | 2970327 | | 7/2012 | |
| GB | 2274335 | | 7/1994 | |
| GB | 2383845 A | * | 7/2003 | ............ G01F 23/72 |

OTHER PUBLICATIONS

Preliminary Research Report, FR Patent Application No. 1451995, dated Dec. 17, 2014.

* cited by examiner

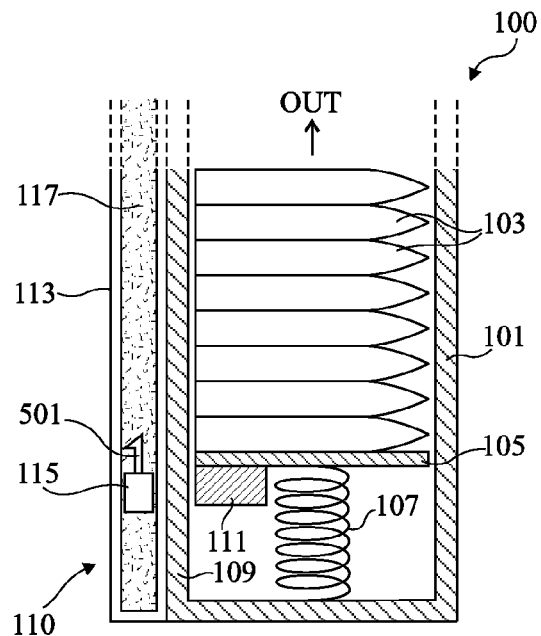
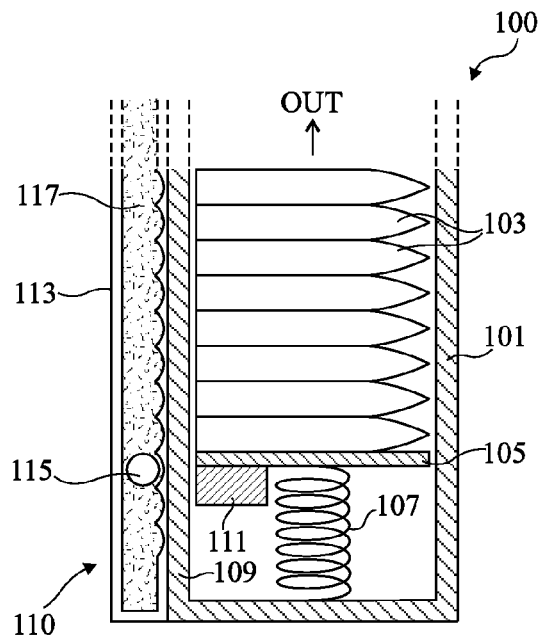
Fig 5    Fig 6
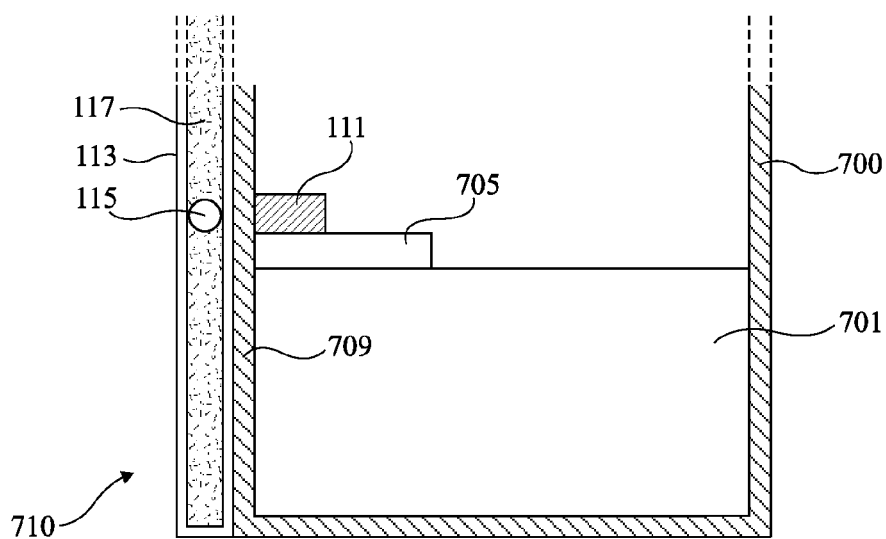
Fig 7

DEVICE FOR INDICATING THE FILLING LEVEL OF A CONTAINER

This application claims the priority benefit of French Patent application number 14/51995, filed on Mar. 11, 2014, the contents of which is hereby incorporated by reference in its entirety to the maximum extent allowable by law.

BACKGROUND

The present disclosure relates to a device for indicating the filling level of a container.

DISCUSSION OF THE RELATED ART

Various solutions enabling to measure the level of a content in a vessel or container have been provided. Such solutions however all have their specific disadvantages. There is a need for a level indication device overcoming all or part of these disadvantages.

SUMMARY

Thus, an embodiment provides a device for indicating the filling level of a container, comprising: a first mobile element located inside of the container and capable of moving along a wall of the container when the filling level of the container varies; an enclosure containing a liquid or a gel, located outside of the container on the side of said wall opposite to the first element; and a second mobile element located inside of the enclosure and plunged into said liquid or gel, the second element being magnetically coupled to the first element and being capable of moving in the enclosure along said wall by following the displacements of the first element.

According to an embodiment, one of the first and second mobile elements comprises a permanent magnet, the other element comprising at least a portion made of a ferromagnetic material.

According to an embodiment, the permanent magnet is made of a material selected from among NdFeB, AlNiCo, and SmCo, and said ferromagnetic material is selected from among NdFeB, iron, nickel, and cobalt.

According to an embodiment, the average density of the second element is equal to the density of said liquid or gel to within 0.5.

According to an embodiment, the average density of the second element is equal to the density of said liquid or gel to within 0.1.

According to an embodiment, the second element comprises a first portion made of a ferromagnetic material having a density greater than that of said liquid or gel and at least a second portion made of a non-ferromagnetic material having a density smaller than or equal to that of said liquid or gel.

According to an embodiment, the first portion comprises at least one ferromagnetic ball and the second portion comprises a coating of the ball with a non-ferromagnetic material, for example, plastic.

According to an embodiment, the viscosity of the liquid or gel is in the range from 0.1 to 100 Pa·s.

According to an embodiment, the second mobile element comprises a plurality of microballs.

According to an embodiment, the second mobile element comprises a ferrofluid.

According to an embodiment, the enclosure comprises a wall exhibiting structures enabling to stabilize the second mobile element in a discrete number of positions.

Another embodiment provides a system comprising an opaque container, and a device for indicating the filling level of this container of the above-mentioned type.

Another embodiment provides a system comprising a firearm magazine, and a device for indicating the filling level of this container of the above-mentioned type.

Another embodiment provides a system comprising a tank or container of a liquid, particularly of inflammable or explosive liquid, and a device for indicating the filling level of this tank of the above-mentioned type.

The foregoing and other features and advantages will be discussed in detail in the following non-limiting description of specific embodiments in connection with the accompanying drawings.

BRIEF DESCRIPTION OF THE DRAWINGS

FIGS. 3, 4, 5, and 6 are cross-section views schematically showing alternative embodiments of the level indication device of FIG. 1; and FIG. 7 is a cross-section view schematically showing an embodiment of a device for indicating the filling level of a liquid tank.

DETAILED DESCRIPTION

Figure 1:
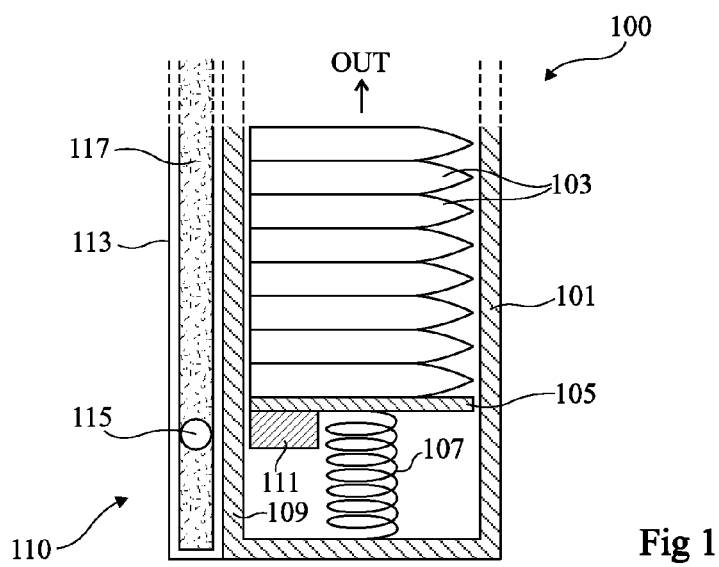
FIG. 1 is a cross-section view schematically showing an embodiment of a device for indicating the filling level of a firearm magazine.

For clarity, the same elements have been designated with the same reference numerals in the various drawings and, further, the various drawings are not to scale. Further, in the following description, terms referring to directions, such as "vertical", "horizontal", "lateral", "under", "above", "upper", "lower", etc., apply to devices arranged as illustrated in the corresponding cross-section views, it being understood that, in operation, the devices may have different directions.

FIG. 1 is a cross-section view schematically and partially showing an example of a firearm magazine 100, and an embodiment of a device 110 for indicating the filling level of magazine 100, that is, of the number of bullets or ammunitions contained in magazine 100.

In this example magazine 100 comprises a container 101, for example, of generally parallelepipedal shape, intended to contain a plurality of bullets 103. Container 101 may be opaque or transparent. Further, the container may be made of a ferromagnetic material or of a non-ferromagnetic material. Container 101 is for example made of metal or of plastic. Container 101 may comprise a discharge opening OUT through which bullets 103 may be extracted for example, to be presented to a firing device (not shown). In the example of FIG. 1, discharge opening OUT of the magazine is formed in an upper wall (not shown) of container 101. In this example, magazine 100 further comprises, inside of container 101, a mobile part 105 which will here be called base, located on the side of bullets 103 opposite to discharge opening OUT. Base 105 is for example formed by a plate approximately parallel to the wall of the container comprising discharge opening OUT. Base 105 is for example made of metal or of plastic. Magazine 100 further comprises a spring 107 compressed between a surface of base 105 opposite to bullets 103 and a wall of container 101 opposite to discharge opening OUT. In operation, each time a bullet 103 is extracted from magazine 100, spring 107 and base 105 push the remaining bullets towards the discharge opening of the magazine, to always present a new bullet at the magazine outlet until the last bullet has been used. Thus, the position of base 105 in container 101 varies according to the filling level of the magazine.

Level indication device 110 comprises a first element 111 mobile with respect to container 101, arranged inside of container 101. In this example, mobile element 111 is attached to the lower surface of base 105, in contact or at a small distance from a lateral wall 109 of container 101. As an example mobile element 111 is arranged at a distance in the range from 0.01 to 5 mm from wall 109. In this example, mobile element 111 comprises a permanent magnet, for example, of NdFeB type (Neodymium Iron Boron), of AlNiCo type (Aluminum Nickel Cobalt), or of SmCo type (Samarium Cobalt).

Level indication device 110 further comprises a guiding enclosure 113 located outside of container 101, on the side of wall 109 opposite to mobile element 111. In this example enclosure 113 comprises a wall placed against wall 109, and substantially extending along the entire height of wall 109.

Device 110 further comprises a second element 115 mobile with respect to container 101, arranged in guiding enclosure 113. In this example, second mobile element 115 comprises at least a portion made of ferromagnetic material, for example, NdFeB, iron, nickel, or cobalt. In the shown example, second mobile element 115 is ball-shaped. Mobile element 115 may however take other shapes.

Mobile elements 111 and 115 of device 110 are magnetically coupled to each other through wall 109, so that a displacement of element 111 along the lower surface of wall 109 causes a corresponding displacement of element 115 along the outer surface of element 109. In other words, the attraction force between elements 111 and 115 is such that outer mobile element 115 follows the displacement of inner mobile element 111 as allowed by guiding enclosure 113. As a non-limiting example, guiding enclosure 113 has the general shape of a cylindrical tube having a diameter slightly greater than the diameter of element 115, allowing vertical displacements of element 115 and preventing any significant lateral displacement of element 115. The described embodiments are however not limited to this specific case. The inner walls of enclosure 113 may optionally comprise a coating, for example, of TEFLON type, enabling to limit frictions with mobile element 115.

Level indication device 110 of FIG. 1 operates as follows. When the filling level of magazine 100 varies, base 105 of the magazine moves vertically along wall 109, driving internal mobile element 111. This displacement causes, on the other side of wall 109, a corresponding displacement of outer mobile element 115. Outer mobile element 115 then indicates the filling level of magazine 100. Indeed, the position of element 115 in guiding element 113 enables to know the position of base 105 in container 101 and thus the quantity of remaining bullets in the magazine.

As an example, the walls of enclosure 113 are transparent, which enables the user to directly see the position of element 115, and thus the filling level of the magazine.

Further, be mobile element 115 directly visible by the user through the walls of enclosure 113 or not, device 110 may optionally comprise a complementary system for reading the position of outer mobile element 115. As an example, such a read system may comprise electrodes placed on the walls of enclosure 113, which allow a capacitive or resistive reading of the position of element 115. As a variation, the complementary read system is capable of optically reading the position of element 115 in enclosure 113. The provision of such a complementary read system for example enables to transmit the information relative to the filling level of container 101 to a distant display or control system.

In a preferred embodiment, guiding enclosure 113 is filled with a liquid or with a gel 117, into which mobile element 115 is totally plunged and moves when the filling level of container 101 varies. The presence of liquid or gel 117 advantageously enables to make device 110 more robust against shocks and vibrations. In particular, the presence of liquid or gel 117 filters the possible shocks or vibrations undergone by magazine 100 and enables to decrease risks of separation of mobile element 115 from mobile element 111 in the occurrence of a shock. Such a separation would indeed make device 110 at least temporarily unusable.

In a preferred embodiment, enclosure 113 contains a liquid 117, and outer mobile element 115 of device 110 is such that its average density d115 is close to density d117 of liquid 117, for example equal to more or less 0.5 and preferably to more or less 0.1 at the density of liquid 117. This enables to make device 110 particularly robust against shocks and vibrations. Indeed, this enables for the buoyancy undergone by element 115, equal to $\rho e*d117*V115*g$, where $\rho e$, V115, and g respectively designate the density of water, the volume of element 115, and gravity acceleration, to approximately compensate for its weight, equal to $\rho e*d115*V115*g$. Thus, in case of an incidental separation of mobile element 115 due to a violent shock, element 115 tends to remain close to the position that it had just before the shock and thus does not come out of the field of attraction of element 111. As a result, the mechanical coupling between mobile elements 111 and 115 forms back immediately after the shock and device 110 thus remains usable.

To improve the robustness against shocks of device 110, liquid or gel 117 filling enclosure 113 may further have a relatively high viscosity, for example in the range from 0.1 Pa·s to 100 Pa·s at ambient temperature.

As a non-limiting example, liquid or gel 117 filling enclosure 113 may be water, oil, a colored liquid, a colloid, bromoform, sodium metatungstate, etc.

It should be noted that usual ferromagnetic materials typically have a density greater than that of most known liquids. Thus, mobile element 115 preferably is a composite element, comprising a plurality of materials having different densities, selected so that the average density of element 115 is close to that of liquid 117. As an example, element 115 comprises at least a portion made of a ferromagnetic material having a density greater than that of liquid 117, and at least a portion made of a non-ferromagnetic material having a density smaller than that of liquid 117, for example, plastic.

Figure 2A:
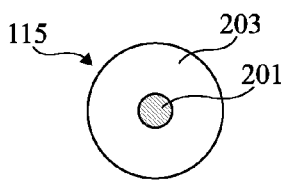
FIGS. 2A and 2B are cross-section views schematically illustrating embodiments of a mobile element of a level measurement device of the type described in relation with FIG. 1.
Figure 2B:
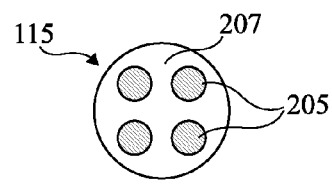

FIGS. 2A and 2B illustrate two embodiments of such a composite mobile element.

In the example of FIG. 2A, element 115 comprises a central ball 201 made of a ferromagnetic material and an outer coating 203 made of a material having a density lower than that of ball 201.

In the example of FIG. 2B, element 115 comprises a plurality of ferromagnetic balls 205 embedded in a ball 207 made of a material of lower density.

Based on the basic principles described hereabove in relation with FIGS. 1, 2A, and 2B, many alternative embodiments can be envisaged. Non-limiting examples of such variations are described hereafter in relation with FIGS. 3, 4, 5, and 6.

FIGS. 3, 4, 5, and 6 are cross-section views, in the same plane as FIG. 1, of magazine 100 and of level indication device 110 of the type described in relation with FIG. 1. In these drawings, magazine 100 is identical or similar to the magazine of FIG. 1. Further, level indication device 110 comprises elements in common with the level indication device of FIG. 1. Hereafter, only the differences with the device of FIG. 1 will be detailed.

Figure 3:
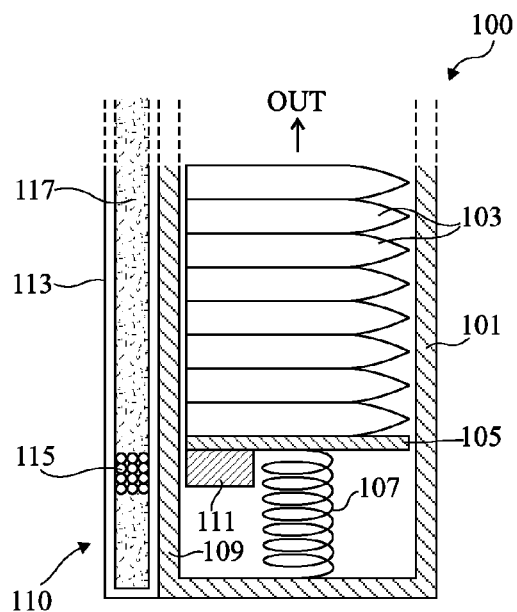

FIG. 3 illustrates an embodiment where element 115 is formed of a plurality of microballs, for example, having a diameter smaller than 1 mm, each of the microballs comprising at least a portion made of a ferromagnetic material. This embodiment enables to increase the resistance against shocks of device 110, particularly by increasing the friction surface between element 115 and liquid or gel 117, and by exploiting the ferromagnetic properties of the microballs. In particular, the microball closest to element 111 will be the more strongly magnetized and will thus attract the other microballs in its vicinity, that is, in front of element 111, thus avoiding for the microballs to disperse in liquid or gel 117.

Figure 4:
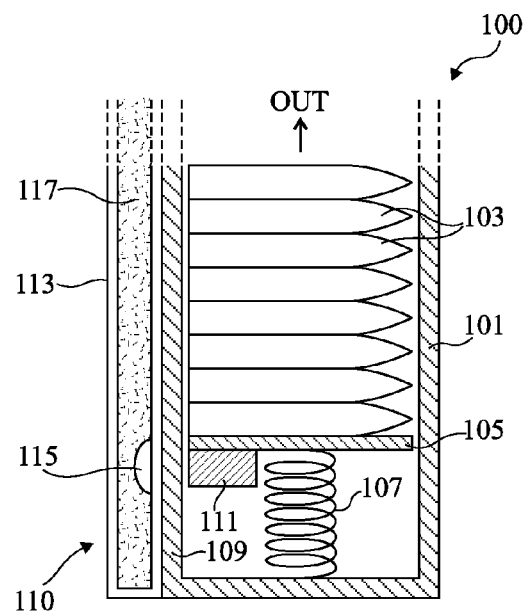

FIG. 4 illustrates an embodiment where element 115 is made of one or a plurality of drops of a ferrofluid, that is, a colloidal suspension comprising ferromagnetic particles of small dimensions, for example having a diameter in the range from 10 nm to 1 μm, or any other colloidal suspension capable of reacting to a magnetic field, for example, by a change of color, of shape, etc. The use of a ferrofluid to form mobile element 115 here again enables to increase the robustness against shocks of the device, for reasons similar to those of the example of FIG. 3.

FIG. 5 illustrates the fact that mobile element 115 is not necessarily ball-shaped and may have any other shape enabling it to move in enclosure 113 when the filling level of container 101 varies. In the example of FIG. 5, element 115 is cylinder-shaped. Further, whatever the shape of element 115, a level indication pointer 501 may be attached to element 115. Pointer 501 may particularly enable to compensate for a possible difference between the position of mobile element 111 located in container 101 and the effective level of the content in the container. In the specific example of a device for indicating the filling level of a firearm magazine, pointer 501 may for example point on the position of the last bullet in the magazine, which enables the user to see at any time the position of the last bullet in the magazine.

FIG. 6 illustrates an alternative embodiment where the inner wall of enclosure 113 along which mobile element 115 moves exhibits structures enabling to stabilize element 115 in a discrete number of positions. In the example of FIG. 6, element 115 is ball-shaped, and the inner wall of enclosure 113 along which mobile element 115 moves has a plurality of holes or notches where element 115 can lodge itself. In this example, each time a bullet 103 is extracted from magazine 100, element 115 moves by one notch in enclosure 113.

Based on the basic principles described in relation with FIGS. 1 to 6, devices for indicating the filling level of a container may be formed for other types of containers and other types of contents than those described in relation with FIGS. 1 to 6. In particular, FIG. 7 illustrates, as a non-limiting example, a device for indicating the level of a liquid in a tank, this device operating similarly to what has been described in relation with FIGS. 1 to 6.

FIG. 7 is a cross-section view schematically and partially showing an example of a tank 700 containing a liquid 701, for example, a fuel tank, and an example of an embodiment of a device 710 for indicating the filling level of tank 700. As in the previous example, tank 700 may be opaque or transparent, and may be made of a ferromagnetic or non-ferromagnetic material.

In this example, level indication device 710 comprises a float 705 placed inside of tank 700 in liquid 701. Float 705 is at the surface of liquid 701, and the vertical position of float 705 follows the level variations of liquid 701. As an example, the float may be mounted on a rail or on a vertical slide to permanently remain close to a lateral wall 709 of tank 700.

Device 710 further comprises the same elements as device 110 of FIGS. 1 to 6, that is, a first mobile element 111 located inside of tank 700, a guiding enclosure 113 located outside of tank 700, and a second mobile element 115 magnetically coupled to first element 111, located inside of enclosure 113.

In the example of FIG. 7, element 111 is attached to float 705, for example, on the upper surface of float 705, at a small distance from wall 709 of the tank.

When the filling level of tank 700 varies, float 705 moves vertically along wall 709 and drives internal mobile element 111 along. Such a displacement causes, on the other side of wall 709, a corresponding displacement of external mobile element 115. The position of external mobile element 115 in the enclosure then indicates the filling level of tank 700.

The alternative embodiments and variations described in relation with FIGS. 1 to 6 are compatible with the embodiment of FIG. 7.

An advantage of the level indication devices described in the present disclosure is that they enable to indicate the filling level of a container whatever the properties of the container walls (opaque, transparent, ferromagnetic or not, etc.). In particular, the described embodiments enable to visually indicate the filling level of a container even when the container walls are opaque.

An advantage of the level indication devices described in the present disclosure is that they are particularly simple to implement and may adapt to many types of containers and of contents.

Another advantage of the described embodiments is that they can operate with no electric power input. This is particularly advantageous in the case of containers intended to contain inflammable or explosive products.

Further, an advantage of the described indicator devices is that they comprise no active element—that is, requiring an electric power supply—inside of the container. This enables to simplify the installation of the device and to avoid risks of ignition or of explosion of the content if it is inflammable or explosive.

Specific embodiments have been described. Various alterations, modifications, and improvements will readily occur to those skilled in the art.

In particular, in the above-described examples, mobile element 111 located inside of the container having its filling level desired to be determined comprises a permanent magnet, and mobile element 115 located outside of the container comprise a portion made of a ferromagnetic material. It will be within the abilities of those skilled in the art to modify the described devices and obtain the desired operation by placing the permanent magnet outside of the container and the ferromagnetic element inside thereof.

Further, the embodiments are for example not limited to the examples of dimensions and of materials mentioned hereabove. It will be within the abilities of those skilled in the art to obtain the desired operation by using other materials and different sizings.

Further, in the above-described embodiments, mobile elements 111 and 115 move along a wall of the container in a single direction. The described embodiments are however not limited to this specific case. According to the type of content and to the type of level indication which is desired to be provided, a level indication device where elements 111 and 115 may move along a wall of the container in at least two directions may be provided. Guiding enclosure 113 may then be adapted accordingly.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A device (110; 710) for indicating the filling level of a container (101; 700), comprising:
    a first mobile element (111) located inside of the container (101; 700) and capable of moving along a wall (109; 709) of the container when the filling level of the container (101; 700) varies;
    an enclosure (113) containing a liquid or a gel (117), located outside of the container (101; 700) on the side of said wall (109; 709) opposite to the first element (111); and
    a second mobile element (115) located inside of the enclosure (113) and plunged into said liquid or gel (117), the second element (115) being magnetically coupled to the first element (111) and being capable of moving in the enclosure (113) along said wall (109; 709) by following the displacements of the first element (111),
    wherein the average density of the second element (115) is equal to the density of said liquid or gel (117) to within 0.5.

2. The device (110; 710) of claim 1, wherein one of the first (111) and second (115) mobile elements comprises a permanent magnet, the other element comprising at least a portion made of a ferromagnetic material.

3. The device (110; 710) of claim 2, wherein said permanent magnet is made of a material selected from among NdFeB, AlNiCo, and SmCo, and said ferromagnetic material is selected from among NdFeB, iron, nickel, and cobalt.

4. The device (110; 710) of claim 1, wherein the second mobile element (115) comprises a plurality of microballs or a ferrofluid.

5. A system comprising an opaque container (101; 700), and the device (110; 710) for indicating the filling level of this container of claim 1.

6. A system comprising a tank or a container (700) of a liquid and the device (710) for indicating the filling level of this tank of claim 1.

7. A device (110; 710) for indicating the filling level of a container (101; 700), comprising:
    a first mobile element (111) located inside of the container (101; 700) and capable of moving along a wall (109; 709) of the container when the filling level of the container (101; 700) varies;
    an enclosure (113) containing a liquid or a gel (117), located outside of the container (101; 700) on the side of said wall (109; 709) opposite to the first element (111); and
    a second mobile element (115) located inside of the enclosure (113) and plunged into said liquid or gel (117), the second element (115) being magnetically coupled to the first element (111) and being capable of moving in the enclosure (113) along said wall (109; 709) by following the displacements of the first element (111),
    wherein the second element (115) comprises a first portion (201; 205) made of a ferromagnetic material having a density greater than that of said liquid or gel (117) and at least a second portion (203; 207) made of a non-ferromagnetic material having a density smaller than or equal to that of said liquid or gel (117).

8. The device (110; 710) of claim 7, wherein said first portion (201; 205) comprises at least one ferromagnetic ball and said second portion comprises a coating of said at least one ball with a non-ferromagnetic material.

9. The device (110; 710) of claim 7, wherein the first mobile element (111) comprises a permanent magnet.

10. The device (110; 710) of claim 9, wherein said permanent magnet is made of a material selected from among NdFeB, AlNiCo, and SmCo, and said ferromagnetic material is selected from among NdFeB, iron, nickel, and cobalt.

11. A system comprising an opaque container (101; 700) and the device (110; 710) for indicating the filling level of this container of claim 7.

12. A system comprising a tank or a container (700) of a liquid and the device (710) for indicating the filling level of this tank of claim 7.

13. A device (110; 710) for indicating the filling level of a container (101; 700), comprising:
    a first mobile element (111) located inside of the container (101; 700) and capable of moving along a wall (109; 709) of the container when the filling level of the container (101; 700) varies;
    an enclosure (113) containing a liquid or a gel (117), located outside of the container (101; 700) on the side of said wall (109; 709) opposite to the first element (111); and
    a second mobile element (115) located inside of the enclosure (113) and plunged into said liquid or gel (117), the second element (115) being magnetically coupled to the first element (111) and being capable of moving in the enclosure (113) along said wall (109; 709) by following the displacements of the first element (111),
    wherein the enclosure (113) comprises a wall exhibiting structures enabling to stabilize the second mobile element (115) in a discrete number of positions.

14. A system comprising an opaque container (101; 700), and the device (110; 710) for indicating the filling level of this container of claim 13.

15. The device (110; 710) of claim 13, wherein one of the first (111) and second (115) mobile elements comprises a permanent magnet, the other element comprising at least a portion made of a ferromagnetic material.

16. The device (110; 710) of claim 15, wherein said permanent magnet is made of a material selected from among NdFeB, AlNiCo, and SmCo, and said ferromagnetic material is selected from among NdFeB, iron, nickel, and cobalt.

17. A system comprising a tank or a container (700) of a liquid and the device (710) for indicating the filling level of this tank of claim 13.

18. A system comprising a firearm magazine (100) comprising an ammunition container (101), and a device (110) for indicating the filling level of this container, comprising:
- a first mobile element (111) located inside of the container (101; 700) and capable of moving along a wall (109; 709) of the container when the filling level of the container (101; 700) varies;
- an enclosure (113) containing a liquid or a gel (117), located outside of the container (101; 700) on the side of said wall (109; 709) opposite to the first element (111); and
- a second mobile element (115) located inside of the enclosure (113) and plunged into said liquid or gel (117), the second element (115) being magnetically coupled to the first element (111) and being capable of moving in the enclosure (113) along said wall (109; 709) by following the displacements of the first element (111).

19. The system of claim 18, wherein one of the first (111) and second (115) mobile elements comprises a permanent magnet, the other element comprising at least a portion made of a ferromagnetic material.

20. The device (110; 710) of claim 19, wherein said permanent magnet is made of a material selected from among NdFeB, AlNiCo, and SmCo, and said ferromagnetic material is selected from among NdFeB, iron, nickel, and cobalt.

* * * * *